Aug. 3, 1943.   A. LYSHOLM   2,325,619
POWER PLANT FOR SUBMARINES AND THE LIKE
Filed Oct. 1, 1940

INVENTOR
ALF LYSHOLM,
By
ATTORNEY

Patented Aug. 3, 1943

2,325,619

UNITED STATES PATENT OFFICE 2,325,619

POWER PLANT FOR SUBMARINES AND THE LIKE

Alf Lysholm, Stockholm, Sweden

Application October 1, 1940, Serial No. 359,205
In Sweden October 3, 1939

11 Claims. (Cl. 60—45)

This invention relates to power plants adapted more particularly for the propulsion of vehicles, vessels and the like such as submarines and torpedoes, which have to carry the entire amount of fuel and air for producing the motive fluid without any possibility of renewing the same during the travel.

It has been proposed to use a liquid oxygen-carrier together with air for the production of the driving fluid in connection with plants of the abovementioned kind. A liquid carrier such as hydrogen peroxide contains within a given volume a large quantity of oxygen and the amount of air necessary to supply the same quantity of oxygen occupies very much more space even if stored in containers at a high pressure.

The main object of the invention is to produce the most favourable consumption of the liquid oxygen-carrier and of the air with respect to the quantities which can be conveniently stored in the vessel or craft containing the power plant. A further object of the invention is to ensure correct and reliable working of the plant particularly on starting up.

According to the present invention in a power plant having a prime mover and a combustion chamber for producing motive fluid for said prime mover by means of fuel air and a liquid oxygen-carrier there is provided manual or automatically actuated means to vary the proportion between the air and the liquid oxygen-carrier and acting so as to increase the liquid-oxygen carrier supply after starting the plant while reducing the air supply.

The invention will be hereinafter more fully described with reference to the accompanying drawing illustrating by way of example more or less diagrammatically two embodiments thereof.

Figure 1:
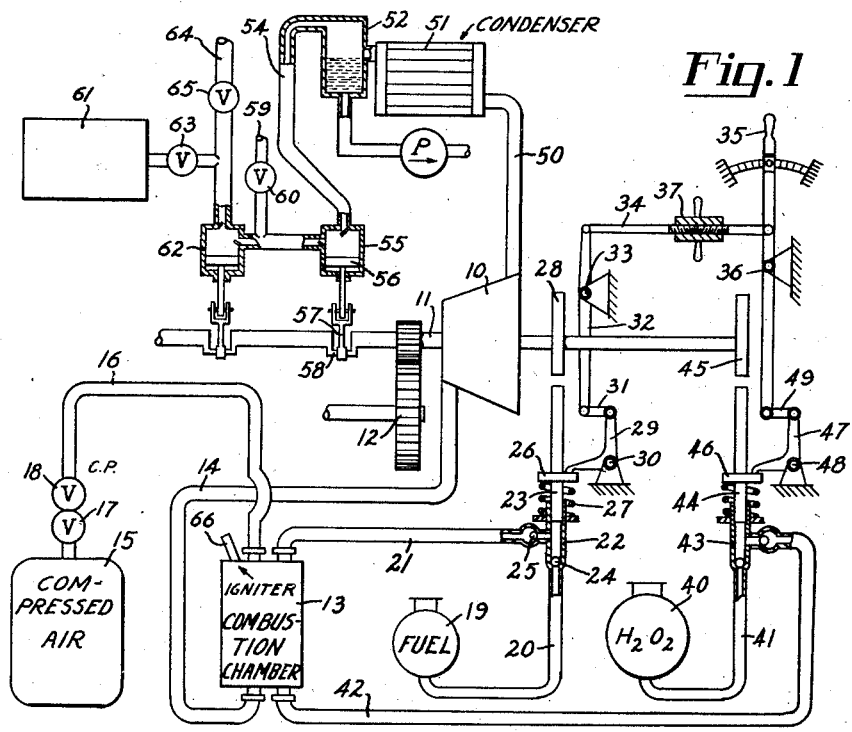

Referring to Fig. 1, 10 denotes a gas turbine, the shaft 11 of which drives a propeller (not shown) for a submarine through a reduction gear 12. Motive fluid is supplied to the gas turbine from a combustion chamber 13 through a conduit 14. A vessel 15 containing compressed air at high pressure is connected through a conduit 16 with the upper part of the combustion chamber 13. A shut-off valve 17 and a constant pressure valve 18 are arranged in the conduit 16.

A fuel container 19 is connected through conduits 20 and 21 to the upper part of the combustion chamber 13. Between said conduits a pump 22 is inserted comprising a plunger 23, an inlet valve 24 and an outlet valve 25. The plunger 23 carries an annular flange 26 between which and the pump housing a spring 27 is arranged which returns the plunger to its original position after each working stroke. The plunger 23 is actuated by an eccentric cam 28 mounted on the turbine shaft 11 and rotating therewith.

The length of stroke of the plunger 23 is limited by a cranked lever 29 pivoted at 30, one end of which bears against the upper surface of the flange 26. A rod 31 is linked to the other end of the lever 29 and also to one end of a lever 32 pivoted at 33. A rod 34 is pivotally connected to the other end of the lever 32 and to a hand lever 35, which latter is pivotally journalled in a bearing 36.

Movement of the lever 35 in one or the other direction around the pivot 36 regulates the angular position of the lever 29 and thus the length of stroke of the plunger 23 thus controlling the amount of fuel delivered by the pump. The length of the rod 34 is adjustable by means of a turnbuckle 37.

A container 40 contains a liquid oxygen carrier, such as hydrogen peroxide. This container is connected through conduits 41 and 42 to the lower part of the combustion chamber 13. In the conduits 41 and 42 pump 43 is interposed which may be of the same construction as the pump 22. The plunger 44 of the pump 43 is actuated by an eccentric cam 45 driven by the shaft 11 of the turbine 10. The plunger 44 carries an annular flange 46 which co-operates with one end of a lever 47 for regulating the length of stroke of the plunger 44 and thus the quantity of liquid oxygen carrier supplied to the combustion chamber. The lever 47 is pivoted at 48 and its other end is linked through a rod 49 linked to the hand lever 35. The hand lever 35 thus also controls the supply of liquid oxygen-carrier to the combustion chamber.

The exhaust conduit 50 of the turbine 10 communicates with a condenser 51, in which combustion products, such as water vapours, are condensed, and in which a vacuum thus prevails. The condensate is collected in a container 52 and is pumped out by a pump 53. The gaseous combustion products, such as carbon dioxide, pass through a conduit 54 to a compressor 55, which in the embodiment shown is provided with a piston 56 connected through a connecting rod 57 to a crank 58 formed on the turbine shaft 11. The compressor 55 driven by the shaft 11 compresses the combustion gases to atmospheric pressure. The gases may subsequently escape to the atmosphere through a conduit 59 having a shut-off valve 60 or they may be stored in a container 61. For the latter purpose there is a further compressor 62, which may be of similar structure to the compressor 55 and may be driven by the shaft 11 of the turbine 10. Between the container 61 and the compressor 62 a valve 63 is provided, while a conduit 64 is provided with a valve 65 through which the combustion gases may escape to the atmosphere.

The power plant operates in the following manner. When starting the plant the shut-off valve 17 is opened. The valve 18 is then automatically opened and air is delivered therethrough and through the conduit 16 at a reduced constant pressure to the combustion chamber 13, and thence to the turbine 10, which begins to rotate. By the rotation of the eccentrics 28 and 45, the pumps 22 and 43 start to deliver fuel and the liquid oxygen carrier to the combustion chamber 13. The fuel is ignited, such as by an ignition device 66. The quantity of liquid oxygen-carrier fed by the pump 43 to the combustion chamber should at the moment of ignition be relatively small as otherwise the flame may be extinguished.

As the combustion of the fuel in the combustion chamber develops, the pressure in the combustion chamber and thus the pressure of the driving fluid admitted to the turbine raises. When operation has continued for some time the supply of oxygen-carrier and of fuel respectively may be increased by operating the hand lever 35 until the turbine operates with the desired effect. The proportion between the supply of fuel and of oxygen-carrier is adjustable by the member 37.

The increased pressure in the combustion chamber sets up a counter-pressure in the conduit 16, which results in a decrease of the air supply from the container 15. The constant pressure valve 18 is so constructed in accordance with the invention that it closes when a predetermined pressure is reached in the chamber 13, and thereafter the fuel is burned solely by the oxygen contained in the liquid carrier stored in the container 40.

The combustion chamber 13 and the conduits connected thereto may be constructed as described in the specification of my co-pending application No. 359,204, filed October 1, 1940.

Figure 2:
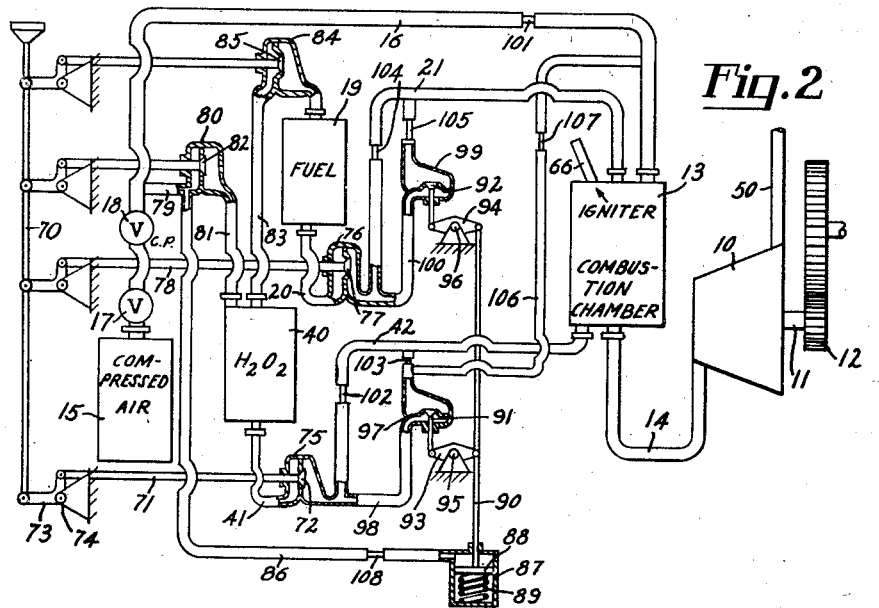

In the embodiment shown in Fig. 2, the same reference characters designate equivalent parts as in the preceding embodiment. The power plant illustrated in Fig. 2 is primarily intended to be used in torpedoes or the like, where there can be no manual control of the plant, when the torpedo has been discharged. The power plant includes a number of valves which are preferably operated by a common member 70 at the moment when the torpedo is launched. The member 70 is linked through any suitable transmission such as a bell crank lever 73 pivoted at 74 to a rod 71 carrying a valve 72. The valve 72 cooperates with a valve housing 75 interposed in the conduits 41 and 42 between the combustion chamber 13 and liquid oxygen carrier container 40. A valve housing 76 is disposed in the conduits 20 and 21 supplying fuel to the combustion chamber 13 from the container 19. In the valve housing 76 is arranged a valve 77 which through the intermediary of a rod 78 is actuated by the member 70 in the same manner as the valve 72.

A conduit 79 extends from the conduit 16 on the low-pressure side of the constant pressure valve 18 and is connected through a valve housing 80 and a conduit 81 to the upper part of the liquid oxygen-carrier container 40. The valve housing 80 contains a valve member 82 operated by the common member 70. The upper part of the container 40 is connected through a conduit 83 to the upper part of the fuel container 19. A valve housing 84 is provided in the conduit 83 and contains a valve 85 likewise operated by the rod member 70.

The conduit 79 in this embodiment communicates with a cylinder 87 through a conduit 86 having a restriction 108 therein. Cylinder 87 encloses a piston 88 actuated by a spring 89. The piston 88 carries a rod 90. Valves 91 and 92 are linked to the rod 90 through levers 93, 94 pivoted at 95, 96 respectively. The valve 91 co-operates with a valve housing 97 which is interposed in a by-pass conduit 98 connected to the conduit 42. The valve 92 co-operates with a valve housing 99 provided in a by-pass conduit 100 of the conduit 21.

A throttling device 101 is provided in the conduit 16 between the combustion chamber 13 and the conduit 79. A throttling device 102 is provided in that part of the conduit 42 extending between the two ends of the by-pass conduit 98. A throttling device 103 is provided in the conduit 98. In the same way throttling devices 104, 105 are disposed in the conduits 21 and 100. A conduit 106 may extend from the conduit 98, preferably from a point between the valve housing 97 and the throttle 103, to the part of the conduit 16 which is located between the throttle 101 and the combustion chamber 13. In the conduit 106 a throttle 107 is provided.

When starting the power plant according to Fig. 2 the rod 70 is moved upwardly which may be effected automatically when the torpedo is launched. Obviously, for the apparatus to function, the shut-off valve 17 must be opened, such opening being effected in any desired and suitable fashion. Passages are now opened between the various conduits pertaining to the plant. The air leaving the container 15 passes the constant pressure valve 18 at a reduced pressure. By means of the throttle 101 in the conduit 16 the pressure is further reduced for the air entering the combustion chamber 13. The valves 72, 77, 82 and 85 are in open position. The pressure air consequently acts through the conduits 79, 81 on the liquid oxygen carrier in the container 40 and presses the same through the conduit 41, valve housing 75, conduit 42 to the lower part of the combustion chamber 13. The air-pressure is also transmitted through the conduit 83 and the valve housing 84 to the fuel container 19, and in this way fuel is admitted through the conduit 20, valve housing 76 and conduit 21 to the upper part of the combustion chamber 13. The fuel is ignited in the combustion chamber 13 and the products of combustion flow through the conduit 14 to the turbine 10 which is set in operation. The amount of the liquid oxygen-carrier and the fuel supplied to the combustion chamber at the actual moment of starting is comparatively small.

The air pressure in the conduit 16 is transmitted through conduits 79 and 86 to the cylinder 87 causing the piston 88 to be moved downwardly against the action of the spring 89. The valves 91 and 92 by this movement of the piston 88 are moved to the open position after some time of operation of the turbine, since owing to the restriction 108 in conduit 86 an appreciable time lag occurs before the air pressure in cylinder 87 is built up sufficiently to actuate piston 88 against the force of spring 89. The liquid oxygen-carrier now also flows to the lower part of the combustion chamber 13 through the by-pass 98 and the valve housing 97. Part of said liquid due to conduit 106 may also be mixed with the air entering the chamber 13 through the conduit 16.

Owing to the valve 92 being opened more fuel can flow to the combustion chamber 13 through the conduit 100. The flow of the liquid oxygen-carrier and of fuel through the various conduits is throttled to a determined degree by the devices 102, 103, 107, and 104, 105 respectively. By virtue of the increased supply of the liquid oxygen-carrier and of the fuel a more intense combustion is set up in the combustion chamber 13 and consequently the pressure is raised therein, until the turbine reaches full working capacity. The increased pressure causes a counter-pressure in the conduit 16 so that the supply of air from the container 15 becomes smaller.

It will be understood that the invention is not limited to the specific forms and arrangements of construction herein disclosed by way of example but includes all such variations and modifications of structure as may fall within the purview of the appended claims.

What I claim is:

1. A power plant intended particularly for submarines, torpedoes and the like comprising a prime mover, a combustion chamber for producing motive fluid for said prime mover, means for supplying fuel, air and a liquid oxygen-carrier to said chamber, and means to vary the proportion between the air and the liquid oxygen-carrier, said means being operable to increase the liquid oxygen-carrier supply and the fuel supply after starting the plant while reducing the air supply.

2. A power plant intended particularly for submarines, torpedoes and the like comprising a prime mover, a combustion chamber for producing motive fluid for said prime mover, means for supplying fuel, air and a liquid oxygen-carrier to said chamber, means operable to simultaneously increase the supply of fuel and of the liquid oxygen-carrier to said chamber after initial operation and means for automatically reducing the air supply to said chamber when said supplies of fuel and liquid oxygen-carrier are increased.

3. A power plant according to claim 1 in which a common member is provided for controlling the supplies of fuel and liquid oxygen carrier to the combustion chamber.

4. A power plant according to claim 1 in which an adjustable member is provided for varying the proportions of the fuel and liquid oxygen carrier supply to the combustion chamber.

5. A power plant according to claim 1, which includes a constant pressure valve provided in the conduit between a container containing compressed air and the combustion chamber.

6. A power plant according to claim 1, and having a prime mover in the form of a turbine, in which the fuel and the liquid oxygen-carrier is delivered in metered quantities to the combustion chamber by means of pumps.

7. A power plant according to claim 1, which includes a branch conduit provided in the conduit delivering liquid oxygen-carrier and in the conduit delivering fuel to the combustion chamber, and means for causing branch conduits to open automatically after the start of the plant to increase the rate of feeding fuel and liquid oxygen-carrier respectively to said chamber.

8. A power plant according to claim 1 which includes branch conduits provided in the conduit delivering liquid oxygen-carrier and in the conduit delivering fuel to the combustion chamber and means in these branch conduits for automatically opening them after the start of the plant to increase the rate of feeding liquid oxygen-carrier and fuel, respectively, to said chamber and a delayed action device actuated by the air pressure for controlling said branch conduits.

9. A power plant according to claim 1, which includes conduits causing communication of the air delivery conduit from an air container with the liquid oxygen-carrier container and the fuel container and externally operable shut-off valves provided in said conduits and in the conduits extending from the two last mentioned containers to the combustion chamber.

10. A power plant according to claim 1, in which the exhaust gases from the turbine escape into a condenser, condensate formed therein being pumped out by a pump, while the residual exhaust gases are compressed to atmospheric pressure by means of a compressor.

11. A power plant according to claim 1 including a condenser to which the exhaust gases from the prime mover are delivered, a pump for removing condensate from said condenser, an exhaust gas container and a compressor for compressing the residual exhaust gases from said condenser and delivering them to said exhaust gas container.

ALF LYSHOLM.